(12) United States Patent
Ogasawara et al.

(10) Patent No.: US 7,542,397 B2
(45) Date of Patent: Jun. 2, 2009

(54) ABERRATION CORRECTION APPARATUS, AND CONTROL APPARATUS, CONTROL METHOD AND CONTROL PROGRAM OF OPTICAL PICKUP

(75) Inventors: Masakazu Ogasawara, Saitama (JP); Toshiharu Ezuka, Saitama (JP)

(73) Assignee: Pioneer Corporation, Tokyo (JP)

( * ) Notice: Subject to any disclaimer, the term of this patent is extended or adjusted under 35 U.S.C. 154(b) by 855 days.

(21) Appl. No.: 11/074,740

(22) Filed: Mar. 9, 2005

(65) Prior Publication Data
US 2005/0206731 A1   Sep. 22, 2005

(30) Foreign Application Priority Data
Mar. 9, 2004   (JP)   .............................. 2004-065070

(51) Int. Cl.
*G11B 7/00* (2006.01)
(52) U.S. Cl. ............. 369/112.02; 369/53.2; 369/112.01; 369/44.23
(58) Field of Classification Search ............ 369/112.02, 369/44.33
See application file for complete search history.

(56) References Cited

U.S. PATENT DOCUMENTS

| | | | | |
|---|---|---|---|---|
| 6,317,251 | B1* | 11/2001 | Wang | ........................ 359/318 |
| 6,385,158 | B1* | 5/2002 | Takagi et al. | ............ 369/112.16 |
| 6,625,102 | B1* | 9/2003 | Hashimoto | ............. 369/112.16 |
| 6,628,589 | B2* | 9/2003 | Iwasaki et al. | ........... 369/53.19 |
| 7,054,253 | B1* | 5/2006 | Nomura et al. | ........ 369/112.02 |
| 7,110,343 | B2* | 9/2006 | Ogasawara | ............ 369/112.02 |
| 7,123,565 | B2* | 10/2006 | Ariyoshi et al. | .......... 369/53.22 |
| 2004/0202075 | A1* | 10/2004 | Ohguri | .................... 369/53.14 |

FOREIGN PATENT DOCUMENTS

| | | |
|---|---|---|
| JP | 10-289465 | 10/1998 |
| JP | 2001-273663 | 10/2001 |

* cited by examiner

*Primary Examiner*—Wayne R Young
*Assistant Examiner*—Adam R Giesy
(74) *Attorney, Agent, or Firm*—Young & Thompson

(57) ABSTRACT

An aberration correction apparatus includes an optical pickup having a liquid crystal panel for correcting an aberration of a light beam emitted from a light source and irradiated on a recording medium and a control unit which applies, to the liquid crystal panel, a bias voltage in order to correct the aberration. The bias voltage is a voltage at which a diffraction generated in the light beam passing through an electrode gap portion between electrode portions of the liquid crystal panel is minimum. For instance, the bias voltage is the voltage at which a phase difference between the light beam passing through the electrode portions of the liquid crystal panel and the light beam passing through the electrode gap portion is an integral multiple of a wavelength of the light beam. It is thereby possible to prevent unnecessary diffracted light from being generated by the liquid crystal panel for correcting the aberrations.

10 Claims, 11 Drawing Sheets

<NO DISC TILT>

<DISC TILE +SIDE>

<DISC TILT −SIDE>

ABERRATION CORRECTION APPARATUS, AND CONTROL APPARATUS, CONTROL METHOD AND CONTROL PROGRAM OF OPTICAL PICKUP

BACKGROUND OF THE INVENTION

1. Field of the Invention

The present invention relates to an optical pickup having a liquid crystal panel for correcting an aberration.

2. Description of Related Art

As to an optical pickup, there is a known technique of mounting a liquid crystal element such as a liquid crystal panel thereon in order to correct various aberrations caused by inclination of an optical disc, a difference in thickness between different optical discs such as a CD and a DVD and so on. For instance, in the case of the optical pickup described in Japanese Patent Application Laid-Open No. 10-289465, a so-called tilt correction to the inclination of the disc is performed by providing wavefront aberration correcting means comprised of the liquid crystal panel on a light path between a laser source and an objective lens. The liquid crystal panel as the wavefront aberration correcting means has its electrodes divided into forms corresponding to wavefront aberration distribution caused by a tilt angle of the optical disc. Different voltages are applied to the divided portions to give different refractive indexes, and a phase difference is given to a laser beam so as to correct the wavefront aberration. To the liquid crystal panel, the voltage corresponding to a direction and an amount of the aberration to be corrected is applied in reference to a predetermined bias voltage. However, there is a problem that reproduction performance deteriorates depending on a set value of the bias voltage.

Japanese Patent Application Laid-Open No. 2001-273663 discloses a method of switching the bias voltage applied to the liquid crystal element in an aberration correction apparatus using the liquid crystal element.

SUMMARY OF THE INVENTION

The above is an example of the problems to be solved by the present invention. An object of the present invention is to set an adequate bias voltage to the optical pickup having the liquid crystal panel for correcting the aberrations so as to effectively correct the aberrations.

According to one aspect of the present invention, there is provided an aberration correction apparatus including an optical pickup having a liquid crystal panel for correcting an aberration of a light beam emitted from a light source and irradiated on a recording medium and a control unit which applies, to the liquid crystal panel, a voltage according to an amount of the aberration in reference to a bias voltage in order to correct the aberration, wherein the bias voltage is a voltage at which a diffraction generated in the light beam passing through an electrode gap portion between electrode portions of the liquid crystal panel is minimum.

The aberration correction apparatus is suitably mounted on a drive apparatus for recording and reproducing information such as an optical disc, for example. A Blu-ray disc (BD), a DVD and a CD are the example of the optical discs. The optical pickup irradiates a light beam such as a laser beam emitted from a light source on the optical disc through an optical system, and has the liquid crystal panel for correcting the aberration caused in particular by a tilt of the optical disc and so on. The refractive index of a liquid crystal layer is changed by the bias voltage applied thereto, and the phase difference is consequently given to the light beam passing through the liquid crystal panel. Thus, by applying, to the liquid crystal panel, an adequate voltage according to the amount of the aberration in reference to the bias voltage, the aberrations caused by the tilt of the disc and so on can be corrected.

The liquid crystal panel generally includes electrodes divided into a plurality of areas, where a phase difference arises between the light beam passing through the electrode portions and the light beam passing through the electrode gap portion between the electrode portions. Here, depending on a relation between the phase difference and a wavelength of the light beam, unnecessary diffracted light is generated due to the phase difference and causes problems such as deterioration of transmission efficiency and reproduction performance. Thus, the bias voltage applied to the liquid crystal panel is set to the voltage at which a diffraction generated in the light beam passing through the electrode gap portion of the liquid crystal panel is minimum, thereby to prevent the problems described above.

In one form of the aberration correction apparatus, the bias voltage may be the voltage at which a phase difference between the light beam passing through the electrode portions of the liquid crystal panel and the light beam passing through the electrode gap portion is an integral multiple of the wavelength of the light beam. By satisfying this condition, it is possible to prevent unnecessary diffracted light from being generated by the liquid crystal panel.

In another form of the aberration correction apparatus, the light source may emit a plurality of light beams having different wavelengths, and the bias voltage may vary according to a wavelength of the light beam. The light source may have a plurality of single-wavelength light sources and an optical system, and it is also possible to use a multiple-wavelength light source such as a dual-wavelength laser source. As for the plurality of light beams having different wavelengths, it is possible to use the bias voltage generating no unnecessary diffracted light for each light beam so as to prevent the deterioration of reproduction performance irrespective of the wavelength of the light beam to be used. As a preferred example, the light source may switch and emit one of the plurality of light beams, and the control unit may switch and use the bias voltage corresponding to the light beam emitted from the light source.

In still another form of the aberration correction apparatus, the light source may emit the plurality of light beams having different wavelengths, and the bias voltage may be a single bias voltage at which the diffraction is minimum as to any of the plurality of light beams.

In this form, one bias voltage is decided and used for the light beams of all the wavelengths so that the diffraction is minimum as to any of the plurality of light beams to be used. Thus, it is possible to suppress generation of the unnecessary diffracted light without necessity to switch the bias voltage by wavelength so as to prevent the problems such as the deterioration of reproduction performance. In a preferred example, the light source may switch and emit one of the plurality of light beams, and the control unit may use the single bias voltage to any of the plurality of light beams.

According to an embodiment of the aberration correction apparatus, the control unit may include a storage unit which stores the bias voltage, a correction voltage deciding unit which decides a correction voltage by changing the bias voltage by a predetermined amount and a correction voltage applying unit which applies the correction voltage to the liquid crystal panel.

According to another aspect of the present invention, there is provided a control apparatus of an optical pickup having a liquid crystal panel for correcting an aberration of a light beam emitted from a light source and irradiated on a recording medium, including a control unit which applies, to the liquid crystal panel, a voltage according to an amount of the aberration in reference to a bias voltage in order to correct the aberration, wherein the bias voltage is the voltage at which a diffraction generated in the light beam passing through an electrode gap portion between electrode portions of the liquid crystal panel is minimum.

With the above-mentioned aberration correction apparatus, it is possible to control the optical pickup having the liquid crystal panel by using this control apparatus so as to suppress the generation of the unnecessary diffracted light on the liquid crystal panel and prevent the problems thereby caused.

According to a further aspect of the present invention, there is provided a control method of an optical pickup having a liquid crystal panel for correcting an aberration of a light beam emitted from a light source and irradiated on a recording medium, including a step of applying to the liquid crystal panel a voltage according to an amount of the aberration in reference to a bias voltage in order to correct the aberration, wherein the bias voltage is the voltage at which a diffraction generated in the light beam passing through an electrode gap portion between electrode portions of the liquid crystal panel is minimum.

With the above-mentioned aberration correction apparatus, it is possible to control the optical pickup having the liquid crystal panel by using this control method so as to suppress the generation of the unnecessary diffracted light on the liquid crystal panel and prevent the problems thereby caused.

According to a still further aspect of the present invention, there is provided a control program of an optical pickup having a liquid crystal panel for correcting an aberration of a light beam emitted from a light source and irradiated on a recording medium is executed by a computer mounted on the control apparatus of the optical pickup, the program causing the computer to function as a control unit which applies, to the liquid crystal panel, a voltage according to an amount of the aberration in reference to a bias voltage in order to correct the aberration, wherein the bias voltage is the voltage at which a diffraction generated in the light beam passing through an electrode gap portion between electrode portions of the liquid crystal panel is minimum.

By executing this control program on the computer mounted on the control apparatus of the optical pickup, it is possible to suppress the generation of the unnecessary diffracted light on the liquid crystal panel and prevent the problems thereby caused.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

Figure 1A:
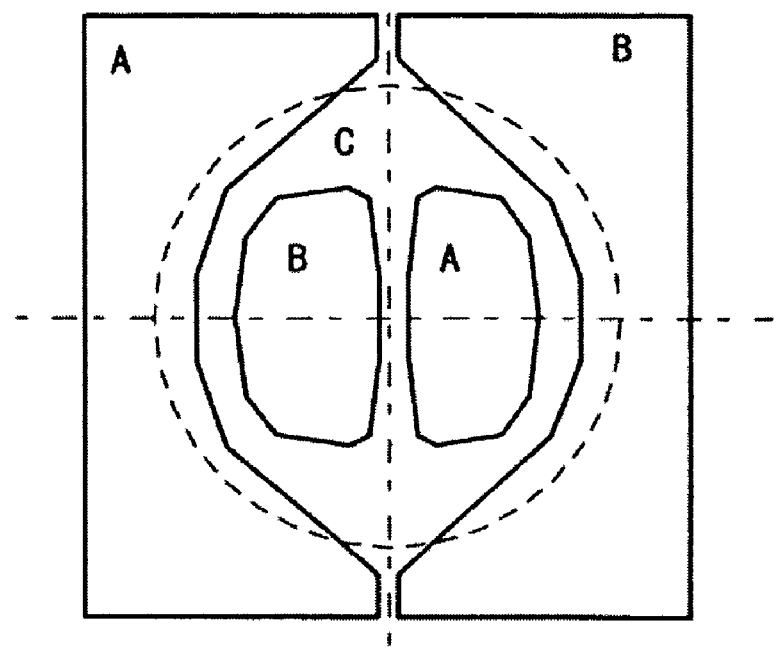
FIG. 1A is a plan view showing an electrode pattern example of a liquid crystal panel for aberration correction.

Hereunder, preferred embodiments of the present invention will be described by referring to the drawings.

[Aberration Correction Principle]

First, a description will be given as to a principle of coma aberration correction (tilt correction) using the liquid crystal panel. FIG. 1A shows an example of an electrode pattern on the liquid crystal panel. The liquid crystal panel has the electrodes formed thereon in a pattern corresponding to coma aberration distribution generated by a disc tilt. This electrode pattern can be divided into an area having a positive phase difference from a reference wavefront, an area having a negative phase difference from the reference wavefront and an area having no phase difference from the reference wavefront.

The liquid crystal panel has a property of changing its refractive index according to the voltage applied to a transparent electrode. Therefore, by controlling the applied voltage, it is possible to give an optical path length difference (phase difference) to the light beams transmitted through the liquid crystal layer in different electrode areas. This property is used to have the liquid crystal panel generate the phase difference for canceling a coma aberration generated by the disc tilt. As the coma aberration generated by the disc tilt has a bipolar phase difference which is positive and negative with respect to the reference wavefront, it is necessary to generate positive and negative phase differences by the liquid crystal panel in order to cancel this aberration. For that reason, it is necessary to give the phase difference uniformly becoming the bias (hereafter, also referred to as a "bias phase difference") to the light beam transmitted through the liquid crystal panel and also generate the positive and negative phase differences in reference to the bias phase difference. Therefore, the bias voltage is applied to the liquid crystal panel in order to generate the bias phase difference, and correction voltages are applied in order to generate the positive and negative phase differences, respectively.

Figure 1B:
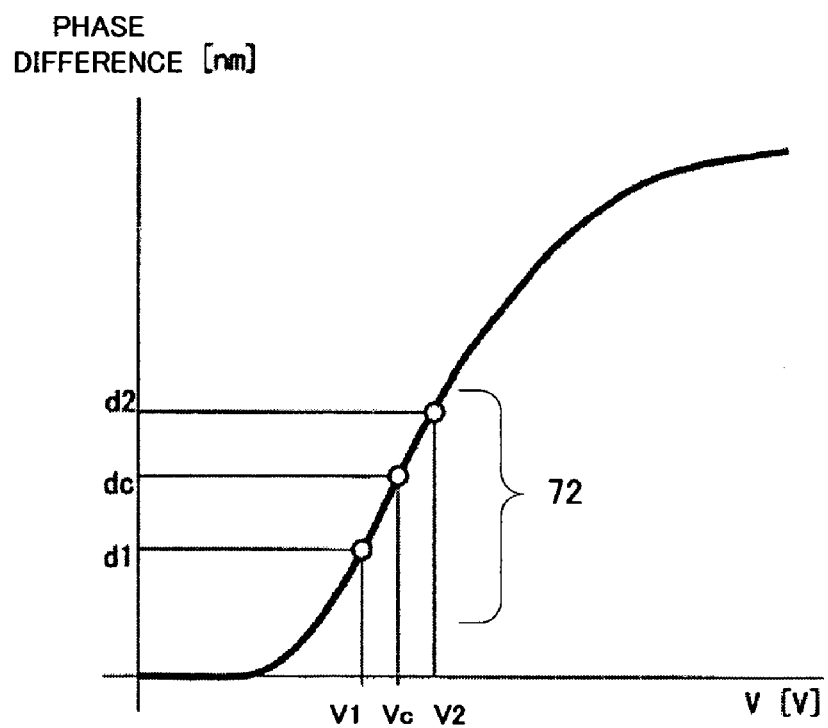
FIG. 1B is a graph showing a relation between an applied voltage to the liquid crystal panel and a generated phase difference.

Specifically, to a liquid crystal panel 70 having the electrode pattern exemplified in FIG. 1A, a bias voltage Vc for generating a bias phase difference dc is applied to an electrode C. As shown in FIG. 1B, a voltage V1 lower than the bias voltage Vc is applied to an electrode A in reference to the bias voltage Vc so as to generate a phase difference smaller than the bias phase difference dc, that is, a negative phase difference d1 with respect to the bias phase difference dc. A voltage V2 higher than the bias voltage Vc is applied to an electrode B so as to generate a phase difference larger than the bias phase difference dc, that is, a positive phase difference d2 with respect to the bias phase difference dc. Thus, it is possible to generate the positive and negative phase differences with respect to the bias phase difference dc. In the case where an inclination property of the disc tilt is reverse, the relation of the voltages V1 and V2 with respect to the bias voltage Vc should be reversed.

Figure 2A:
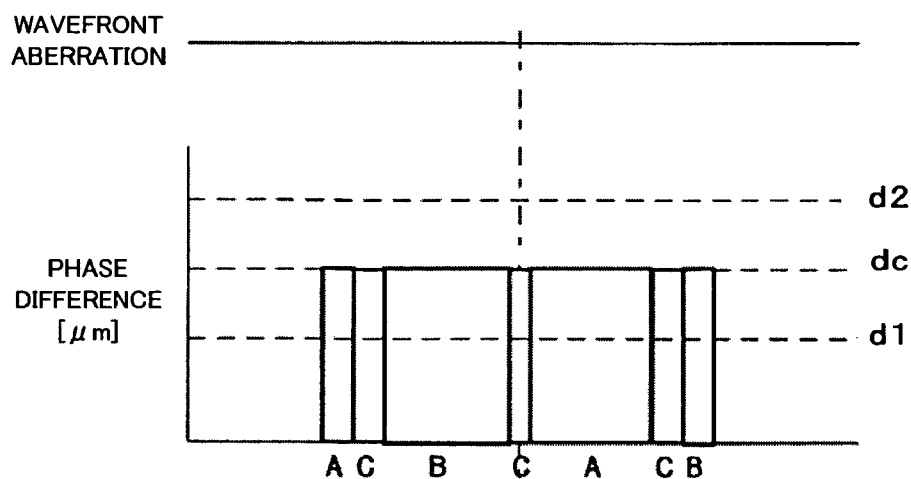
FIGS. 2A to 2C show control examples of the liquid crystal panel according to a disc tilt amount.
Figure 2B:
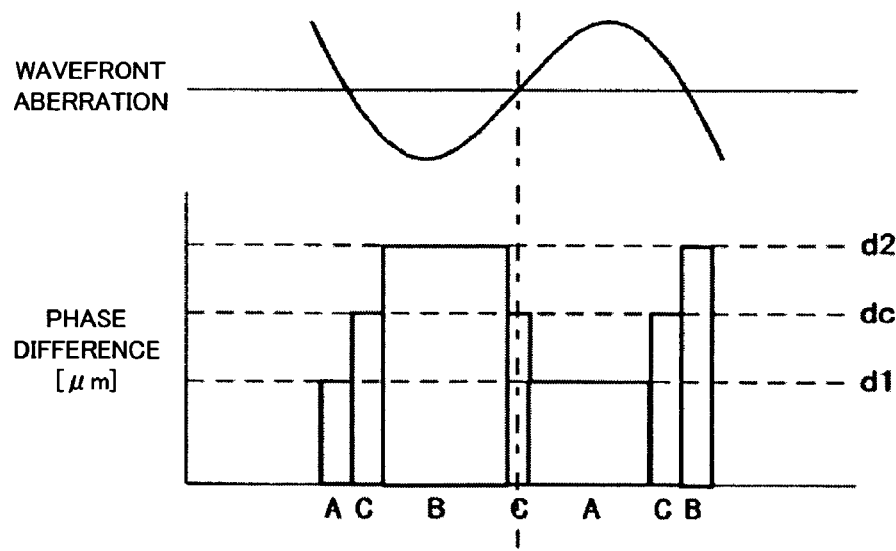
Figure 2C:
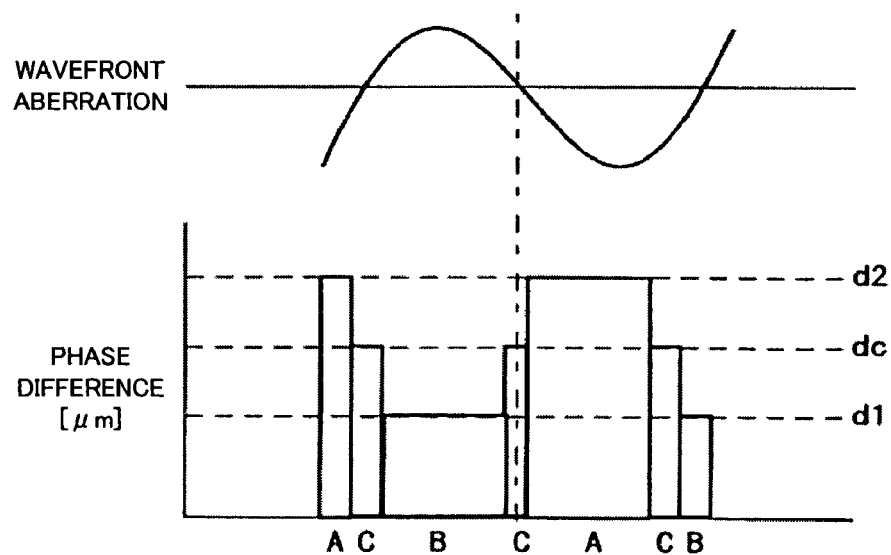

FIGS. 2A to 2C show relations between a disc tilt state and a phase difference generated by the liquid crystal panel in order to correct the wavefront aberration generated by the disc tilt.

FIG. 2A shows an example of the case that no disc tilt is present, wherein no wavefront aberration is generated. Therefore, the bias voltage Vc is applied to all the electrodes of the liquid crystal panel 70, and the uniform bias phase difference dc is generated in the entire area of the liquid crystal panel 70.

FIG. 2B shows an example of the case that the disc tilt is generated on a positive (+) side, wherein the wavefront aberration is positive in the area on the right side of the liquid crystal panel 70 and negative in the area on the left side thereof. As for the liquid crystal panel 70, the bias voltage Vc is applied to an electrode C to generate the bias phase difference dc. The voltage V1 is applied to the electrode A and the negative phase difference d1 with respect to the bias phase difference dc is generated so that the wavefront aberration is thereby canceled. The voltage V2 is applied to the electrode B and the positive phase difference d2 with respect to the bias phase difference dc is generated so that the wavefront aberration is thereby canceled. Consequently, the light beam having passed through the liquid crystal panel 70 is supplied to an objective lens in a state in which the wavefront aberration caused by the disc tilt is corrected.

FIG. 2C shows an example of the case that the disc tilt is generated on a negative (−) side, wherein the wavefront aberration is negative in the area on the right side of the liquid crystal panel 70 and positive in the area on the left side thereof. As for the liquid crystal panel 70, the bias voltage Vc is applied to the electrode C so as to generate the bias phase difference dc. The voltage V2 is applied to the electrode A and the positive phase difference d2 with respect to the bias phase difference dc is generated so that the wavefront aberration is thereby canceled. The voltage V1 is applied to the electrode B and the negative phase difference d1 with respect to the bias phase difference dc is generated so that the wavefront aberration is thereby canceled. Consequently, the light beam having passed through the liquid crystal panel 70 is supplied to the objective lens in the state in which the wavefront aberration caused by the disc tilt is corrected.

[Bias Voltage]

As described above, it is necessary to apply the bias phase difference by applying a predetermined bias voltage in order to generate the positive and negative phase differences by the liquid crystal panel. In general, the bias voltage Vc is set to be approximately in the middle of a linear area (area 72 in FIG. 1B) of phase difference characteristic of the liquid crystal panel. This is intended to make dynamic ranges of the positive and negative phase differences approximately equal in reference to the bias phase difference.

Figure 3A:
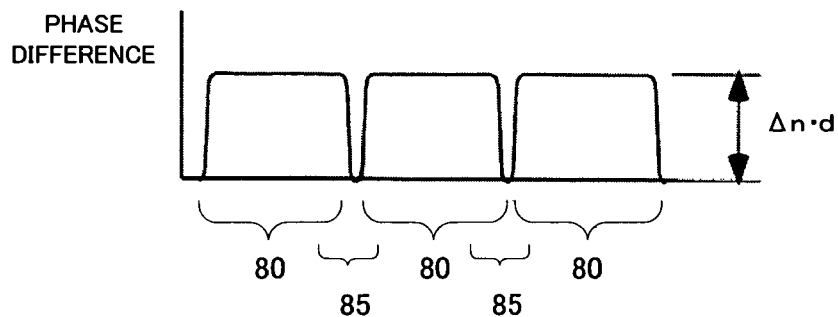
FIGS. 3A to 3C are diagrams illustrating an appearance of generation of high-order diffracted lights in an electrode gap portion of the liquid crystal panel.
Figure 3B:
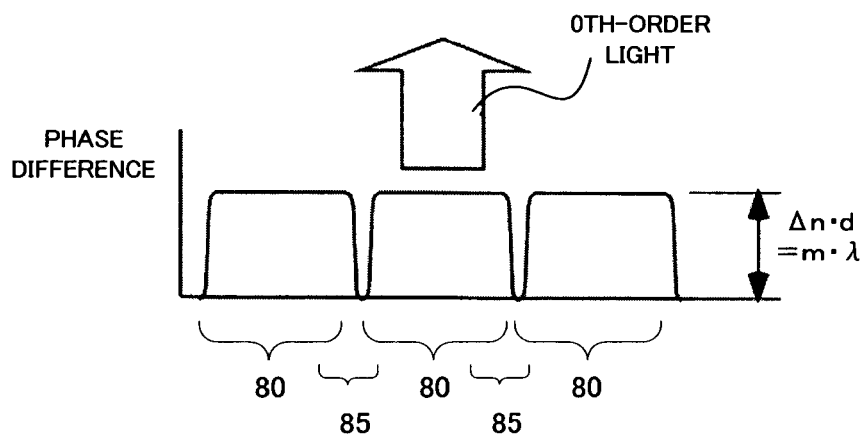
Figure 3C:
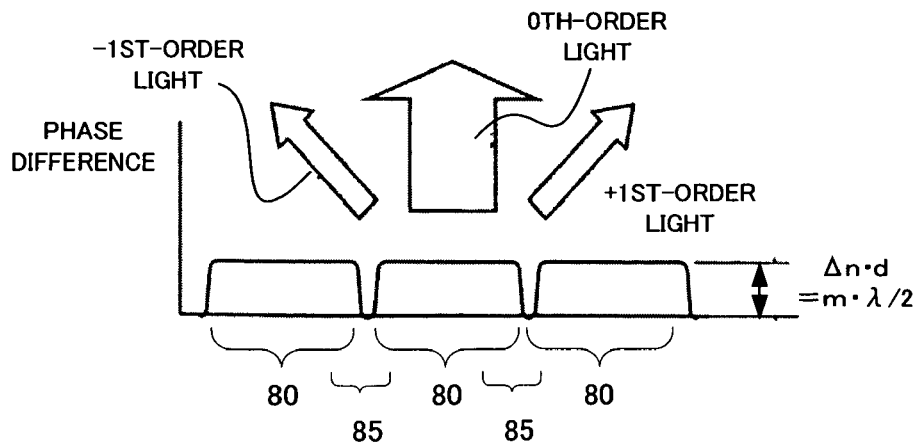

However, depending on the setting of the bias voltage Vc, there may arise a problem that unnecessary diffraction is generated by the liquid crystal panel. This will be described in detail. FIGS. 3A to 3C schematically show a structure of the liquid crystal panel and an appearance of the diffraction generated by the liquid crystal panel.

The liquid crystal panel is constituted by sandwiching the liquid crystal layer between a pair of glass substrates forming the transparent electrodes. The liquid crystal panel for aberration correction has the transparent electrodes divided according to the aberration distribution to be corrected. There normally exists a gap of 2 to 5 μm between adjacent transparent electrodes.

It is now assumed that there is a liquid crystal panel comprised of three electrode portions. As shown in FIG. 3A, an electrode gap portion 85 exist between adjacent electrode portions 80. If the same bias voltage Vc is applied to each of the electrode portions 80, the same phase difference Δn d is given to the light beam transmitted through the areas of the electrode portions 80 as schematically shown in FIG. 3A. In the electrode gap portion 85, however, no phase difference is generated even if the bias voltage Vc is applied. Namely, no phase difference is generated to the light beam transmitted through the electrode gap portion 85 even if the bias voltage Vc is applied to each of the electrodes of the liquid crystal panel.

Here, in the case where the phase difference generated by the bias voltage Vc is an integral multiple (m: integer) of the wavelength of the light beam, the gap in the phase difference generated by the electrode gap portion 85 causes no action as shown in FIG. 3B. However, in the case where the phase difference generated by the bias voltage Vc is ½ of the wavelength of the light beam, the electrode portions 80 and electrode gap portions 85 act as a diffraction grating so that the diffracted light of a high order (±1 order or higher) is generated as shown in FIG. 3C. This diffracted light increases as the number of the electrode gap portions 85, i.e., the number of divisions of the electrodes becomes larger. For instance, in the case where there are many electrode gap portions 85 in a peripheral portion of the light beam transmitted through the liquid crystal panel, there occur many diffractions in surrounding portions of an effective luminous flux, and the light volume in surrounding portions of a luminous flux incident on the objective lens is relatively reduced. Consequently, the size of a light spot focused on the optical disc by the objective lens becomes larger. In addition, the diffracted light originally unnecessary gets incident on the objective lens, and hence a problem of causing an aberration may arise. Thus, it is necessary to suppress the generation of such diffracted light.

First Embodiment

Hereunder, a first embodiment of the present invention will be described. The first embodiment sets the bias voltage to be applied to the liquid crystal panel so that the phase difference given to the light beam transmitted through the liquid crystal panel becomes an integral multiple of the wavelength of the light beam. Thus, the generation of the diffracted light as in FIG. 3B is suppressed.

Figure 4:
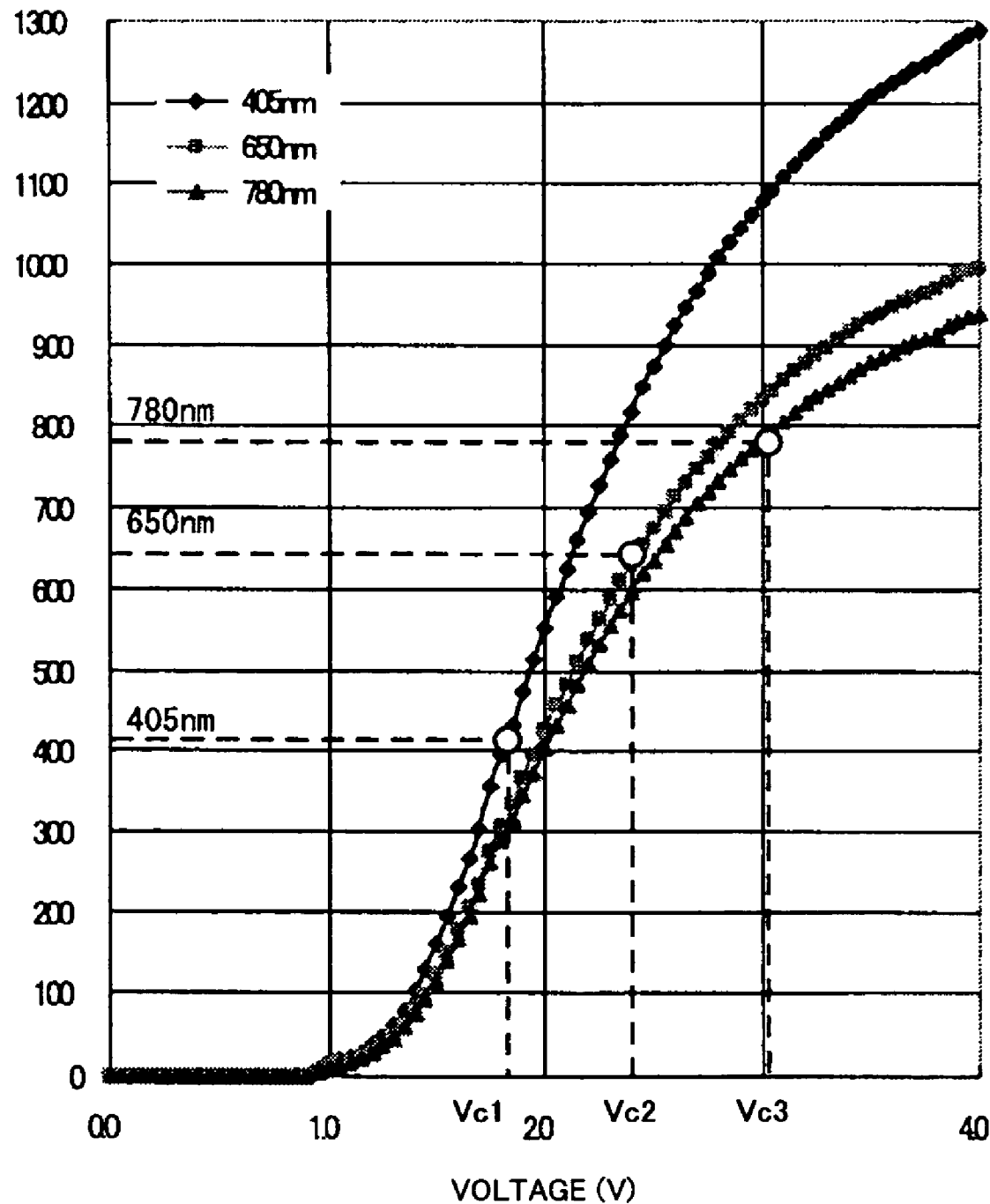
FIG. 4 is a graph showing the relation between the voltage applied to the electrodes of the liquid crystal panel and the generated phase difference as to laser wavelengths of a BD, a DVD and a CD.

FIG. 4 shows the relation between the voltage applied to the electrodes of the liquid crystal panel and the phase difference thereby given to each laser beam as to a blue laser beam of 405 nm used for the Blu-ray disc (BD), a red laser beam of 650 nm used for the DVD and an infrared laser beam of 780 nm used for the CD. This is an example of the liquid crystal panel of which duty ratio of the area between the electrode portions and the electrode gap portions is 50 percent.

In FIG. 4, a voltage Vc1 indicates the voltage at which the phase difference given to the blue laser beam of 405 nm by the liquid crystal panel is equal to its wavelength (405 nm). Likewise, a voltage Vc2 indicates the voltage at which the phase difference given to the red laser beam of 650 nm by the liquid crystal panel is equal to its wavelength (650 nm), and a voltage Vc3 indicates the voltage at which the phase difference given to the infrared laser beam of 780 nm by the liquid crystal panel is equal to its wavelength (780 nm). Thus, by determining the bias voltage for the laser beam of each wavelength to have the phase difference generated by the liquid crystal panel match with its wavelength, the diffracted light generated by the liquid crystal panel as described by referring to FIGS. 3A to 3C can be suppressed. Specifically, as to the example of this liquid crystal panel, the bias voltage applied to the liquid crystal panel is set to Vc1 when using the laser beam for the BD, the bias voltage applied to the liquid crystal panel is set to Vc2 when using the laser beam for the DVD, and the bias voltage applied to the liquid crystal panel is set to Vc3 when using the laser beam for the CD.

Figure 5:
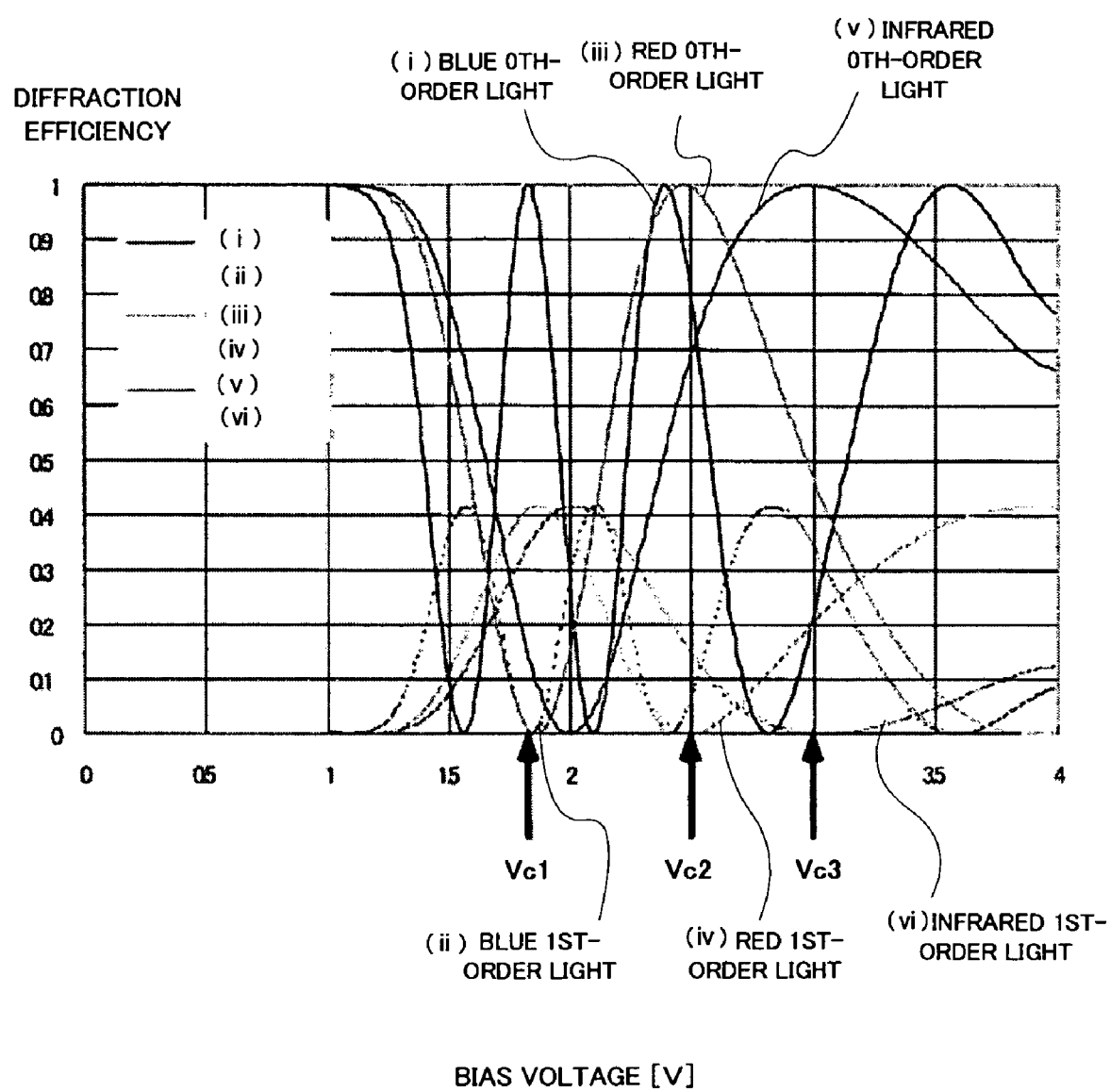
FIG. 5 is a graph showing the relation between the voltage applied to the liquid crystal panel and diffraction efficiencies of 0th(zeroth)-order and 1st (first)-order diffracted light as to the laser wavelengths of a BD, a DVD and a CD, where bias voltage values for the laser wavelengths are indicated.

FIG. 5 shows the relation between the bias voltage applied to the liquid crystal panel and diffraction efficiency of a 0th-order light and a 1st-order light of the laser beams. In FIG. 5, a solid line of "BLUE 0th-ORDER LIGHT" indicates the 0th-order light of the laser beam for the BD, and a broken line of "BLUE 1st-ORDER LIGHT" indicates the 1st-order light of the laser beam for the BD. A solid line of "RED 0th-ORDER LIGHT" indicates the 0th-order light of the laser beam for the DVD, and a broken line of "RED 1st-ORDER LIGHT" indicates the 1st-order light of the laser beam for the DVD. A solid line of "INFRARED 0th-ORDER BEAM" indicates the 0th-order light of the laser beam for the CD, and a broken line of "INFRARED 1st-ORDER LIGHT" indicates the 1st-order light of the laser beam for the CD. As shown in FIG. 5, the diffraction efficiency of the blue 1st-order light is 0 at the bias voltage Vc1 applied when using the laser for the BD. The diffraction efficiency of the red 1st-order light is 0 at the bias voltage Vc2 applied when using the laser for the DVD. The diffraction efficiency of the infrared 1st-order light is 0 at the bias voltage Vc3 applied when using the laser for the CD. Thus, it is possible, with the liquid crystal panel placed for aberration correction, to prevent unnecessary high-order diffracted light from being generated whichever optical disc is used.

The examples in FIG. 4 show the cases where, as to the wavelengths of the laser beams for the BD, DVD and CD, the phase differences generated by the liquid crystal panel match with the wavelengths thereof, i.e., one time. As previously described, however, it is not limited to one time. If the phase difference generated by the liquid crystal panel is an integral multiple (m times) of the wavelength of the light beam to be used, it is possible to prevent the unnecessary diffracted light as shown in FIG. 3C from being generated. Therefore, the same effect can be obtained by a configuration for giving the bias voltage at which the phase difference generated by the liquid crystal panel is twice the wavelength of the laser beam.

Figure 6:
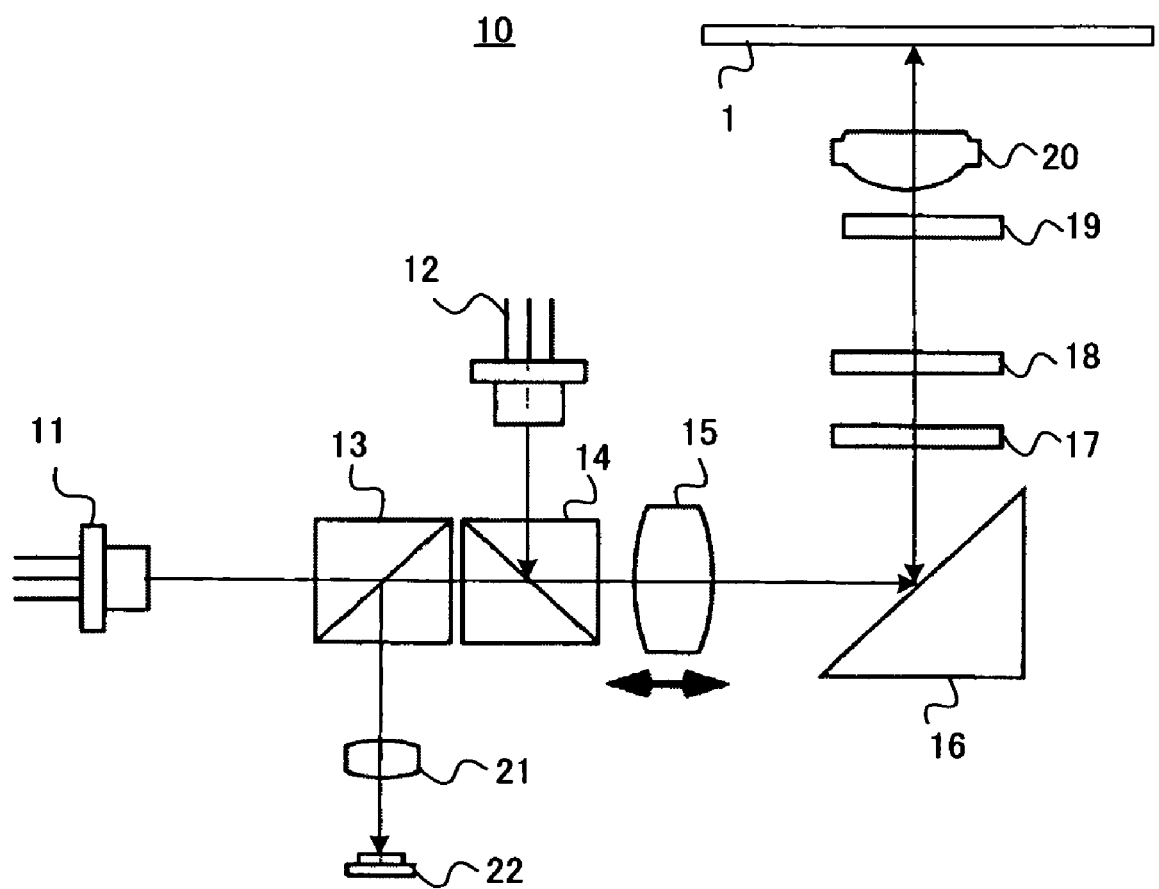
FIG. 6 is a block diagram showing a configuration of an optical pickup according to the embodiment of the present invention.

FIG. 6 schematically shows the configuration of the optical pickup according to the first embodiment. In FIG. 6, an optical pickup 10 is adapted to the three wavelengths, capable of irradiating the laser beams for the BD, DVD and CD on the optical disc. As the light sources, the optical pickup 10 includes a blue LD (laser diode) 11 for emitting the laser beams for the BD and a two-wavelengths LD 12 of red and infrared for emitting the laser beams for the DVD and CD.

The laser beam of 405 nm emitted from the blue LD 11 passes through a polarizing beam splitter (PBS) 13 and a dichroic/PBS prism 14, is changed to parallel light by a collimator lens 15 and is directed upward by a mirror 16. The laser beam is irradiated on a recording surface of a disc 1 by an objective lens 20 after passing through a liquid crystal panel 17 for aberration correction, a ¼ wavelength plate 18 adapted to the three wavelengths and a compatibility element 19. The liquid crystal panel 17 is the above-mentioned liquid crystal panel for aberration correction, which gives adequate phase differences to the laser beams based on the bias voltage and correction voltage applied from the outside. The ¼ wavelength plate 18 converts the laser beams supplied from the liquid crystal panel 17 from linear polarization to circular polarization. The compatibility element 19 adjusts an aperture ratio and corrects the aberrations according to differences in wavelength among the laser beams for the BD, DVD and CD and differences in thickness among the discs of the BD, DVD and CD. The compatibility element 19 is comprised of a holographic lens, for instance.

The laser beam for the DVD or CD emitted from the two-wavelength LD 12 is reflected by the dichroic/PBS prism 14 in the direction of the collimator lens 15, and is then irradiated on the optical disc 1 via the same path as the laser beam for the BD.

The laser beam reflected by the optical disc 1 passes through the compatibility element 19, the ¼ wavelength plate 18 and the liquid crystal panel 17, and has its direction changed by the mirror 16. It is then transmitted through the collimator lens 15 and dichroic/PBS prism 14, and has its direction changed by the PBS 13 so as to be focused on a detector 22 via a condenser lens 21. The beam irradiated on the detector 22 is photoelectrically converted to an electrical signal from which a reproduction signal and a servo error signal are then generated.

According to the above embodiment, the two-wavelength LD is used to generate the laser beams for the DVD and CD. However, application of the present invention is not limited to this. Namely, it is sufficient that the laser beams for the BD, DVD and CD are generated by the configuration before the collimator lens 15 and are switched to be irradiated on the optical disc 1.

Figure 7:
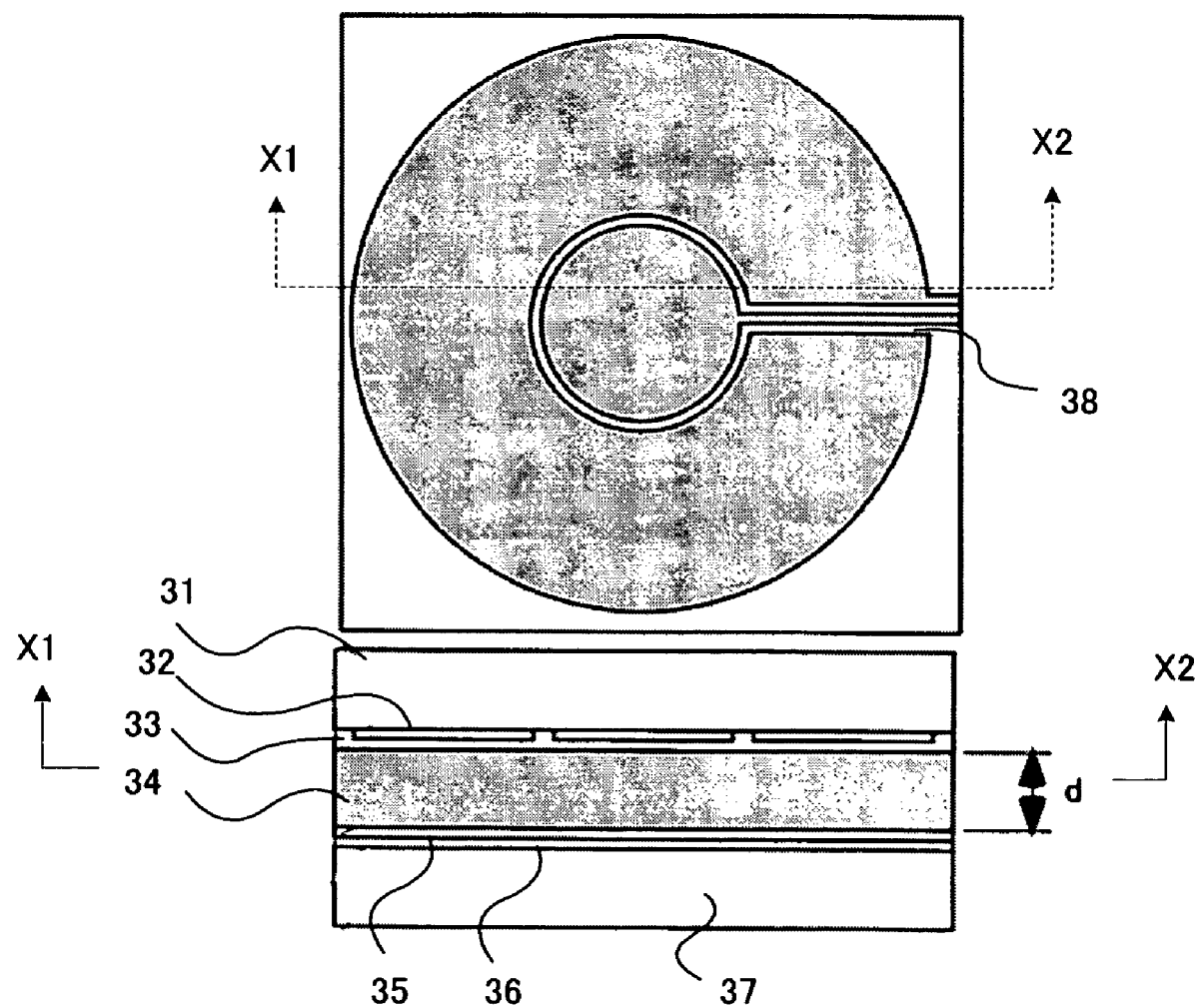
FIG. 7 shows a plan view and a sectional view showing the configuration of the liquid crystal panel for aberrations correction.

Next, the configuration of the liquid crystal panel 17 will be described. FIG. 7 shows a configuration example of the liquid crystal panel 17. In this example, an electrode 32 is comprised of an approximately circular electrode at the center and an annular electrode on its outer circumference, and a gap 38 configuring an electrode gap is formed between these electrodes. The form of the electrode 32 is decided according to a distribution pattern of the aberrations to be corrected as previously described, and FIG. 7 shows an example different from the electrode pattern of the liquid crystal panel for tilt correction shown in FIG. 1.

FIG. 7 shows a plan view of the liquid crystal panel 17 and a sectional view at a section line X1 to X2 thereof. As shown in the sectional view, the liquid crystal panel 17 is configured by sandwiching a liquid crystal layer 34 between a pair of transparent glass substrates 31 and 37. On an under surface of the upper glass substrate 31, an upper electrode 32 in a concentric pattern shown in the plan view is formed with ITO (Indium Tin Oxide) and so on. On an upper surface of the lower glass substrate 37, a lower electrode 36 of the ITO is also formed on the entire surface thereof or in the same pattern as the upper electrode 32. On the undersurface of the upper electrode 32 and on the upper surface of the lower electrode 36, orientation films 33 and 35 for controlling orientation of liquid crystal molecules in the liquid crystal layer 34 are formed, respectively.

In this configuration, the orientation of the liquid crystal molecules in the liquid crystal layer 34 is controlled by applying the aforementioned bias voltage Vc and correction voltage between the upper electrode 32 and the lower electrode 36, and the refractive index is changed. The phase difference is thereby given to the laser beams passing through the liquid crystal panel 17 as previously described.

Figure 8:
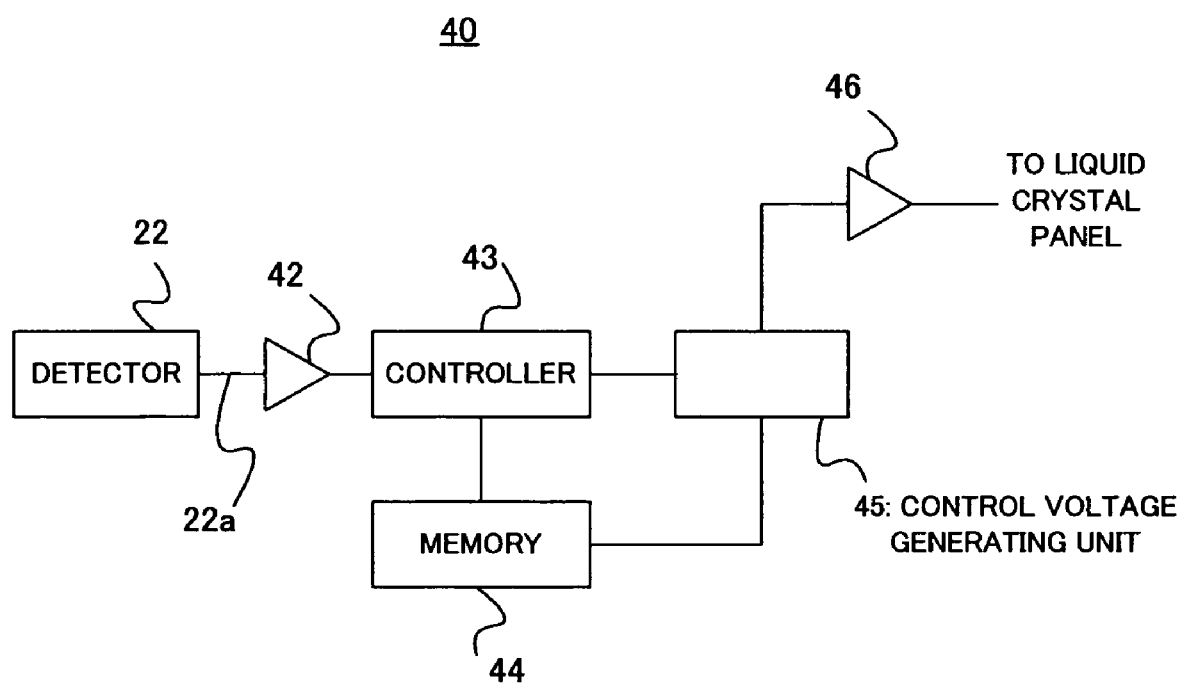
FIG. 8 is a block diagram showing the configuration of a control unit of the optical pickup.

FIG. 8 shows the configuration of a control unit 40 for controlling the voltage applied to the liquid crystal panel 17. The control unit 40 is electrically connected to the optical pickup. Specifically, a reproduction signal 22a from the detector 22 of the optical pickup 10 shown in FIG. 6 is amplified by an amplifier 42 and supplied to a controller 43. The reproduction signal 22a includes an RF signal, a push-pull signal, an LPP (Land PrePit) signal and so on. The controller 43 may be a computer such as a CPU.

A memory 44 stores the bias voltages Vc1 to Vc3 for the aforementioned BD, DVD and CD, and these bias voltages are read out by the controller 43.

The controller 43 determines a kind of the disc based on the reproduction signal 22a obtained from the detector 22. Specifically, each of the BD, DVD and CD has different reflectivity so that the controller 43 determines whether the disc to be recorded or reproduced is the BD, DVD or CD based on the magnitude of the RF signal included in the reproduction signal and provides a determination result to a control voltage generating unit 45. The controller 43 also detects a radial tilt amount (disc tilt amount) based on the push-pull signal and so on, and calculates a necessary correction amount so as to supply it to the control voltage generating unit 45.

The control voltage generating unit 45 determines the voltage to be applied to the electrode portions of the liquid crystal panel 17 (referred to as a "correction voltage") based on the bias voltages read from the memory 44 and the correction amount of the disc tilt supplied from the controller 43 so as to supply it to a liquid crystal driver 46. The liquid crystal driver 46 applies the supplied correction voltage to the electrode portions of the liquid crystal panel 17. Thus, the phase difference for canceling the radial tilt detected by the controller 43 is given to the laser beam transmitted through the liquid crystal panel 17, and the disc tilt is corrected.

The memory 44 has the bias voltages Vc1 to Vc3 for the BD, DVD and CD stored therein, respectively. These bias voltages are determined independently by the wavelength of the laser beam to be used. The control voltage generating unit 45 generates the correction voltage, based on the determination result of the kind of the disc by the controller 43, with using the bias voltage corresponding to the disc as a reference.

Figure 9:
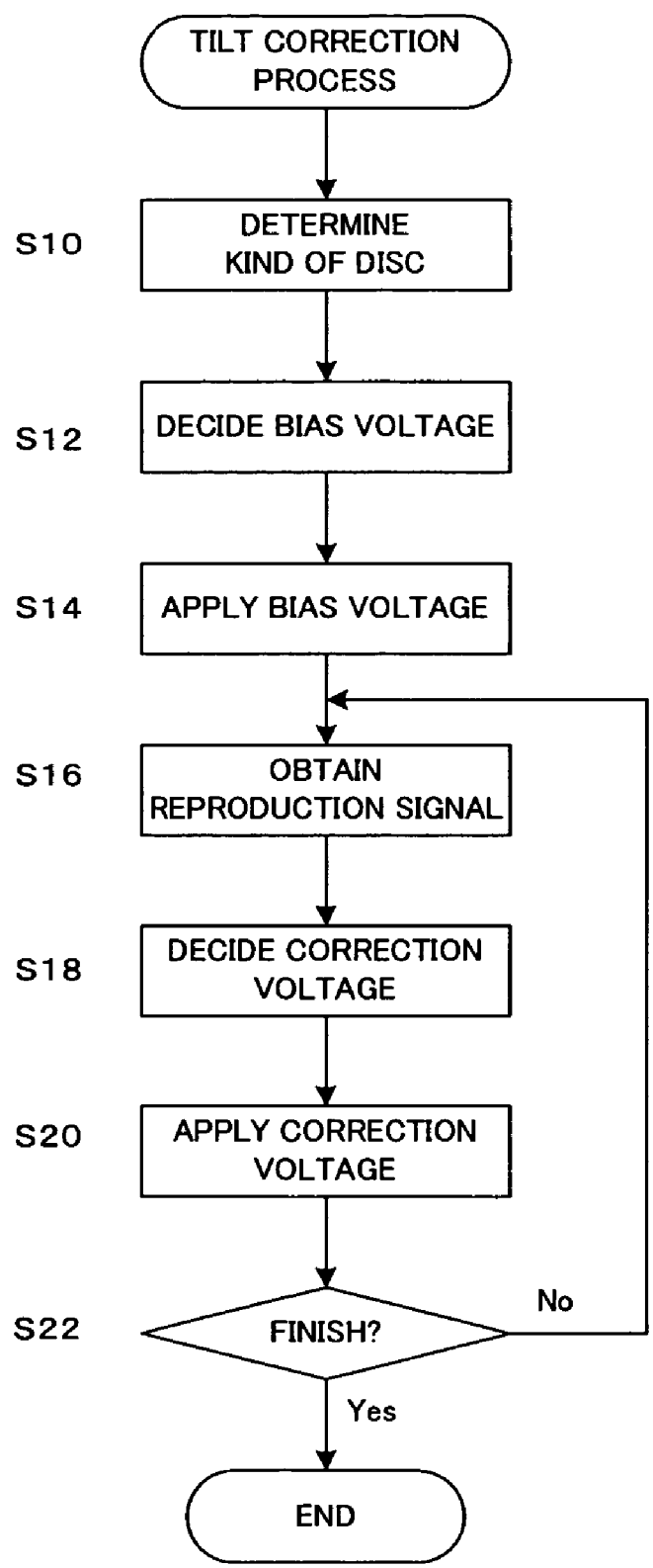
FIG. 9 is a flowchart of an example of a tilt correction process.

FIG. 9 shows a flowchart of a tilt correction process. This process is implemented by having a microcomputer mounted on a drive apparatus of the disc execute a program recorded on a computer readable recording medium prepared in advance and operate as the controller 43 and control voltage generating unit 45 shown in FIG. 8.

First, when the optical disc is inserted into the drive apparatus, the controller 43 determines the kind of the disc based on the light volume of the RF signal and a focus error signal (step S10). The determination result is supplied to the control voltage generating unit 45. The controller 43 reads the bias voltage corresponding to the disc from the memory 44 according to the determination result of the kind of the disc and supplies it to the control voltage generating unit 45.

The control voltage generating unit 45 determines the bias voltage (step S12), and drives the liquid crystal driver 46 to apply the bias voltage to the liquid crystal panel 17 (step S14). This bias voltage is determined so that the unnecessary diffracted light in the electrode gap portion of the liquid crystal panel 17 becomes minimum at the wavelength of the laser beam used. Therefore, it causes no problem in recording and reproduction.

Once the bias voltage is applied, a focus servo and a tracking servo are turned on. The control voltage generating unit 45 obtains the reproduction signal from the disc (step S16), and decides the correction voltage based on the tracking error signal and the magnitude of the RF signal included therein (step S18) so as to apply the correction voltage (step S20). Thus, the aberrations generated by the disc tilt and the error due to the thickness of the cover layer of the disc are corrected. The process from step S16 to S20 is repeated until the recording and/or reproduction of the disc is finished.

If another optical disc is inserted into the drive apparatus, the kind of the disc is determined by the above process, and the driving voltage of the liquid crystal panel 17 is switched to the bias voltage suited to that disc. Thus, whichever disc is recorded and/or reproduced, each electrode of the liquid crystal panel 17 is driven by the bias voltage suited to the disc so that no unnecessary diffracted light is generated.

Figure 10A:
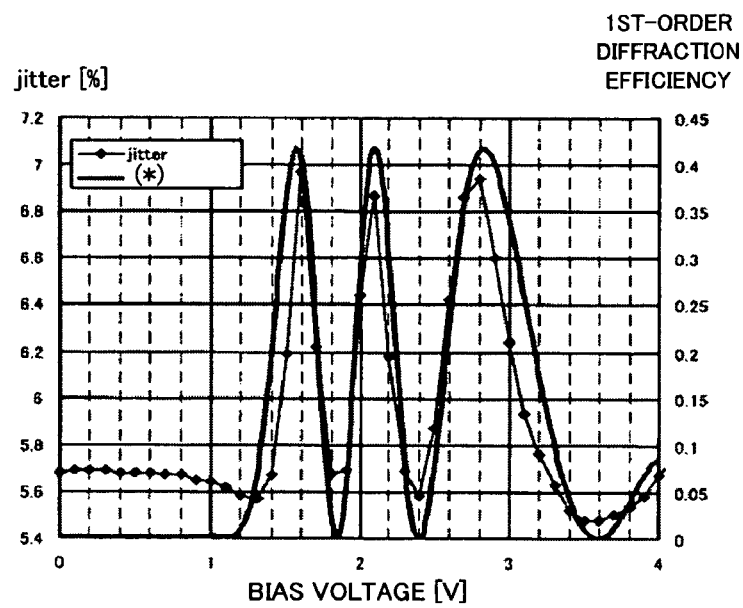
FIGS. 10A and 10B are graphs showing the relation between 1st-order diffraction efficiency and a reproduction jitter in the case of applying the bias voltage decided by the present invention to the BD and DVD.
Figure 10B:
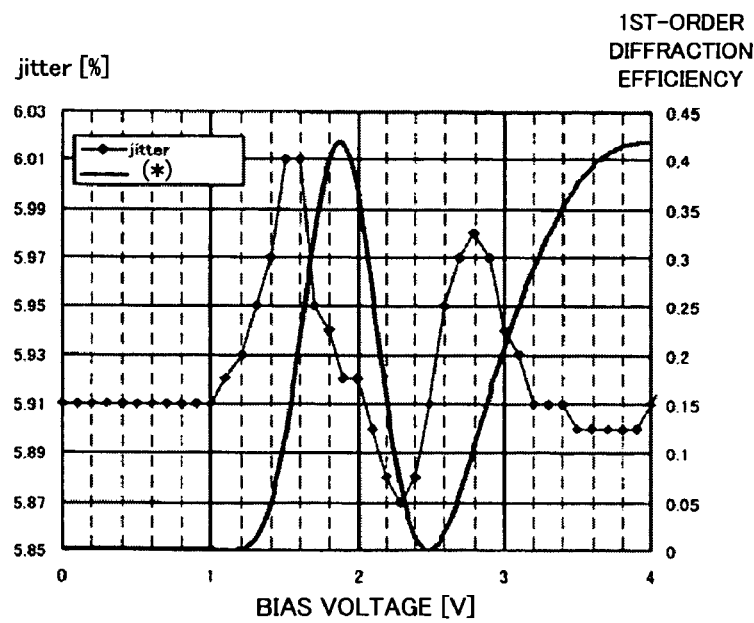

FIGS. 10A and 10B show the relation among the bias voltage, reproduction jitter and diffraction efficiency of the 1st-order light according to the first embodiment. FIG. 10A is the case of the BD, and FIG. 10B is the case of the DVD. In both the graphs, the 1st-order diffraction efficiency changes according to the change of the bias voltage. It can be seen that the reproduction jitter amount has a correlation with to the 1st-order diffraction efficiency and the reproduction jitter amount is small at the voltage at which the 1st-order diffraction efficiency is small. Namely, by adequately setting the bias voltage to be applied to the electrodes of the liquid crystal panel, it is possible to suppress the generation of the unnecessary diffracted light in the electrode gap portion of the liquid crystal panel and to consequently suppress the reproduction jitter.

The relation between the bias voltage and the reproduction jitter is different between the BD and the DVD which use different laser wavelengths. Therefore, to suppress an unnecessary diffraction by the liquid crystal panel and also to reduce the reproduction jitter, it is effective to set the bias voltage varying according to a laser wavelength of the disc to be recorded and/or reproduced and to switch among them in use.

Second Embodiment

The first embodiment set the bias voltage varying according to a laser wavelength used for recording and/or reproducing the disc. As opposed to this, the second embodiment uses one common bias voltage for all the laser wavelengths. This common bias voltage Vca is set to the voltage at which the diffraction generated by the liquid crystal panel is minimum at any laser wavelength. Specifically, one bias voltage at which the unnecessary diffracted light of the liquid crystal panel is minimum in each laser wavelength is set as the common bias voltage Vca.

Figure 11:
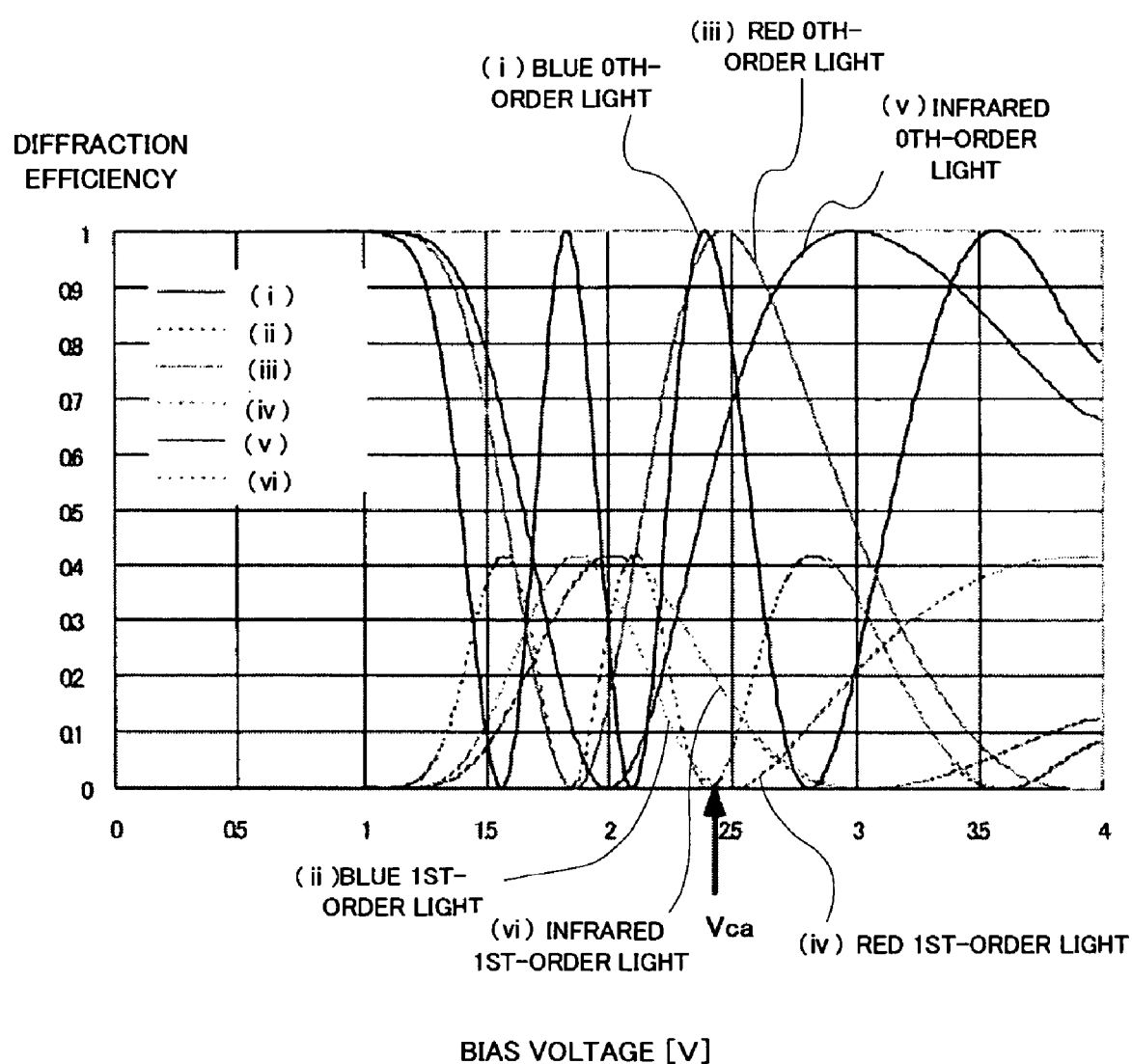
FIG. 11 is a graph showing a common bias voltage according to a second embodiment.

FIG. 11 shows an example thereof. The common bias voltage Vca is set to approximately 2.4V. At that voltage, all the diffraction efficiencies of the blue 1st-order light, red 1st-order light and infrared 1st-order light are sufficiently low. Therefore, it is possible to reduce the unnecessary diffracted light generated by the liquid crystal panel.

As the second embodiment uses the common bias voltage Vca for all the laser wavelengths, it is not necessary to determine the disc and switch the bias voltage as in the first embodiment.

The configuration of the optical pickup of the second embodiment is the same as that of the first embodiment. As for the configuration of the control unit 40, the memory 44 in the control unit 40 of the first embodiment shown in FIG. 8 has to store only the common bias voltage Vca. The controller does not need to determine the kind of the disc. The control voltage generating unit 45 obtain the reproduction signal by applying the common bias voltage Vca irrespective of the kind of the disc so as to perform the tilt correction and so on as required.

Modification

The above embodiments use the optical pickup having the light source of a plurality of wavelengths. However, application of the present invention is not limited to this. Namely, even in the case of the optical pickup having only the light source of a single wavelength, it is sufficient to set the bias voltage applied to the liquid crystal panel for aberration correction so that the phase difference generated by the liquid crystal panel may become an integral multiple of the single wavelength.

Even when the optical pickup having the light source of a plurality of wavelengths is used, in case of correcting the aberrations by the liquid crystal panel for the laser beams of certain wavelengths only, it is possible to apply the present invention only to the laser beams of the wavelengths which are subjected to the aberration correction. Namely, only for the wavelengths whose aberrations are corrected by the liquid crystal panel, the bias voltage applied to the liquid crystal panel is set such that the phase difference generated by the liquid crystal panel becomes an integral multiple of the single wavelength. In that case, for the laser wavelengths whose aberrations are not corrected by the liquid crystal panel, either no voltage is applied to the liquid crystal panel or the level of the applied voltage is set to be lower than the voltage at which the liquid crystal molecules act. Thus, it is possible to suppress the deterioration of the medium, which is not subjected to the aberration correction by the liquid crystal panel, due to the diffraction by the liquid crystal panel.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2004-65070 filed on Mar. 9, 2004 including the specification, claims, drawings and summary is incorporatedhereinby reference in its entirety.

What is claimed is:

1. An aberration correction apparatus comprising:
an optical pickup having a liquid crystal panel for correcting an aberration of a light beam emitted from a light source and irradiated on a recording medium; and
a control unit which applies, to the liquid crystal panel, a voltage according to an amount of the aberration in reference to a bias voltage in order to correct the aberration,
wherein the bias voltage is a voltage at which a diffraction generated in the light beam passing through an electrode gap portion between electrode portions of the liquid crystal panel is minimum.

2. The aberration correction apparatus according to claim 1, wherein the bias voltage is a voltage at which a phase difference between the light beam passing through the electrode portions of the liquid crystal panel and the light beam passing through the electrode gap portion is an integral multiple of a wavelength of the light beam.

3. The aberration correction apparatus according to claim 2, wherein the light source emits a plurality of light beams having different wavelengths, and the bias voltage varies according to the wavelength of the light beam.

4. The aberration correction apparatus according to claim 3, wherein the light source switches and emits one of the plurality of light beams, and wherein the control unit switches the bias voltage corresponding to the light beam emitted from the light source.

5. The aberration correction apparatus according to claim 1, wherein the light source emits a plurality of light beams having different wavelengths, and wherein the bias voltage is a single bias voltage at which the diffraction is minimum as to any of the plurality of light beams.

6. The aberration correction apparatus according to claim 5, wherein the light source switches and emits one of the plurality of light beams, and wherein the control unit uses the single bias voltage to any of the plurality of light beams.

7. The aberration correction apparatus according to claim 1, wherein the control unit comprises:
a storage unit which stores the bias voltage;
a correction voltage determining unit which determines a correction voltage by changing the bias voltage by a predetermined amount; and
a correction voltage applying unit which applies the correction voltage to the liquid crystal panel.

8. A control apparatus of an optical pickup having a liquid crystal panel for correcting an aberration of a light beam emitted from a light source and irradiated on a recording medium, comprising:
a control unit which applies, to the liquid crystal panel, a voltage according to an amount of the aberration in reference to a bias voltage in order to correct the aberration,
wherein the bias voltage is a voltage at which a diffraction generated in the light beam passing through an electrode gap portion between electrode portions of the liquid crystal panel is minimum.

9. A control method of an optical pickup having a liquid crystal panel for correcting an aberration of a light beam emitted from a light source and irradiated on a recording medium, comprising:
a step which applies to the liquid crystal panel a voltage according to an amount of the aberration in reference to a bias voltage in order to correct the aberration, wherein the bias voltage is a voltage at which a diffraction generated in the light beam passing through an electrode gap portion between electrode portions of the liquid crystal panel is minimum.

10. A control program recorded on a computer readable recording medium of an optical pickup having a liquid crystal panel for correcting an aberration of a light beam emitted from a light source and irradiated on a recording medium, the program executed by a computer mounted on a control apparatus of the optical pickup, the program causing the computer to function as a control unit which applies, to the liquid crystal panel, a voltage according to an amount of the aberration in reference to a bias voltage in order to correct the aberration, wherein the bias voltage is a voltage at which a diffraction generated in the light beam passing through an electrode gap portion between electrode portions of the liquid crystal panel is minimum.

* * * * *